United States Patent
Richard et al.

(10) Patent No.: US 9,266,508 B2
(45) Date of Patent: Feb. 23, 2016

(54) ELECTRO-HYDRAULIC DYNAMIC BRAKING SYSTEM AND CONTROL METHOD

(71) Applicant: Robert Bosch GmbH, Stuttgart (DE)

(72) Inventors: Philippe Richard, Chelles (FR); Bastien Cagnac, Cramoisy (FR); Remy Garnier, Remseck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 13/854,373

(22) Filed: Apr. 1, 2013

(65) Prior Publication Data
US 2013/0221737 A1    Aug. 29, 2013

Related U.S. Application Data (63) Continuation of application No. 13/588,491, filed on Aug. 17, 2012, now abandoned.

(51) Int. Cl.
| | |
|---|---|
| *B60T 8/36* | (2006.01) |
| *B60T 8/1755* | (2006.01) |
| *B60T 7/12* | (2006.01) |
| *B60T 13/14* | (2006.01) |
| *B60T 13/74* | (2006.01) |
| *B60T 8/48* | (2006.01) |

(52) U.S. Cl.
CPC .............. *B60T 8/1755* (2013.01); *B60T 7/12* (2013.01); *B60T 8/4872* (2013.01); *B60T 13/146* (2013.01); *B60T 13/745* (2013.01)

(58) Field of Classification Search
CPC ....... B60T 7/12; B60T 13/146; B60T 8/4872; B60T 8/1755; B60T 13/745; B60T 13/143; B60T 13/145

USPC .............. 303/119.1, DIG. 10, DIG. 11, 116.2
See application file for complete search history.

(56) References Cited

U.S. PATENT DOCUMENTS

| | | | | |
|---|---|---|---|---|
| 5,388,898 | A | * | 2/1995 | Reinartz et al. ............. 303/116.2 |
| 5,741,050 | A | * | 4/1998 | Ganzel et al. ................... 303/10 |
| 6,053,582 | A | * | 4/2000 | Ganzel ........................ 303/113.3 |
| 6,634,724 | B2 | * | 10/2003 | Kobayashi et al. ........... 303/155 |

(Continued)

FOREIGN PATENT DOCUMENTS

| | | |
|---|---|---|
| DE | 10 2004 027 256 | 1/2005 |
| DE | 10 2007 030 441 | 1/2009 |

(Continued)

*Primary Examiner* — Thomas J Williams
*Assistant Examiner* — Mariano Sy
(74) *Attorney, Agent, or Firm* — Kenyon & Kenyon LLP (57) ABSTRACT

The system includes a high-pressure accumulator connected to the primary chamber of the master cylinder and to the inlet of the ESP module by a solenoid valve. The connection between the primary chamber and the brake fluid reservoir is equipped with a solenoid valve. A control circuit controls the solenoid valve of the reservoir and the solenoid valve of the accumulator, depending on the braking method selected or imposed. The dynamic braking phase is broken down into two tasks, one with energy recovery that involves isolating the master cylinder from the wheel brakes until deceleration to a threshold speed, followed by another step until full stop that involves connecting the primary chamber alone to the high-pressure accumulator and to the ESP module to provide the latter with pressurized brake fluid from the accumulator and supply the wheel brakes for mechanical braking.

17 Claims, 8 Drawing Sheets

(56) References Cited

U.S. PATENT DOCUMENTS

| | | | |
|---|---|---|---|
| 7,367,187 B2* | 5/2008 | Ikeda et al. | 60/545 |
| 8,061,786 B2* | 11/2011 | Drumm et al. | 303/115.4 |
| 8,864,244 B2* | 10/2014 | Leiber et al. | 303/4 |
| 2006/0186733 A1* | 8/2006 | Drumm | 303/114.1 |
| 2008/0284240 A1* | 11/2008 | Jeong | 303/11 |
| 2011/0006596 A1* | 1/2011 | Leiber et al. | 303/13 |
| 2011/0024242 A1* | 2/2011 | Yang et al. | 188/106 P |
| 2011/0115282 A1* | 5/2011 | Dinkel et al. | 303/3 |
| 2013/0043718 A1* | 2/2013 | Feigel | 303/14 |

FOREIGN PATENT DOCUMENTS

| | | |
|---|---|---|
| WO | WO 2009/083217 | 7/2009 |
| WO | WO 2009/121645 | 10/2009 |

\* cited by examiner

ELECTRO-HYDRAULIC DYNAMIC BRAKING SYSTEM AND CONTROL METHOD

RELATED APPLICATION INFORMATION

The present application is a continuation of, and claims priority to, U.S. patent application Ser. No. 13/588,491, filed on Aug. 17, 2012, which claims priority to and the benefit of French patent application no. 1102551, which was filed in France on Aug. 19, 2011, the disclosure of which is incorporated herein by reference.

FIELD OF THE INVENTION

The present invention relates to an electro-hydraulic dynamic brake system comprising an electric-motor servo-brake actuating a master cylinder connected to the wheel brakes through a trajectory correction module. The present invention also relates to a control method for an electro-hydraulic dynamic brake system.

BACKGROUND INFORMATION

Such electro-hydraulic dynamic brake systems are believed to be understood. However, their structure is relatively complex.

SUMMARY OF THE INVENTION

The present invention is intended to simplify the electro-hydraulic dynamic brake system so that recovered energy can be put to the best use while employing simple embodiments that occupy little space and are capable of being incorporated into the trajectory correction module known as the ESP module.

The present invention involves a dynamically operated electro-hydraulic brake system of the type described above, characterized in that it comprises:
 a high-pressure accumulator connected to the primary chamber of the master cylinder and the inlet of the ESP module by a solenoid valve;
 a control circuit that receives braking request signals from the servo-brake and ESP module to control the solenoid valve of the high-pressure accumulator according to the selected or imposed method of braking;
 the circuit controlling:
  a preparatory braking phase, during which the high-pressure accumulator is filled from the primary chamber by actuating the servo-brake in the absence of any action on the brake or mechanical brake control by the ESP module and by preventing the supply of brake fluid accumulated in the high-pressure accumulator;
  a dynamic braking phase, broken down into two steps:
   a dynamic braking phase properly speaking, with energy recovery, wherein the master cylinder is isolated from the wheel brakes and the servo-brake is enabled to respond to the action on the brake pedal until deceleration to a threshold speed;
   another step from threshold speed to full stop, during which the primary chamber alone is connected to the high-pressure accumulator and the ESP module in order to provide it with pressurized brake fluid from the accumulator and to supply the wheel brakes for mechanical braking.

This brake system can be used to suitably transition into dynamic braking mode, that is, with energy recovery, while having the ability to yield to a priority operating mode imposed by outside parameters applied to the control system or by the parameters imposed by the ESP module. The simplicity of this embodiment can be used to increase the field of application of dynamic braking, even for braking actions of short duration. Additionally, the transition to dynamic braking and the switch between the first step of dynamic braking with energy recovery and the second step, when braking is provided by pressurized liquid in the high-pressure accumulator, is fully transparent to the driver, who remains unaware of the dynamic braking mode with energy recovery or the conclusion of braking with pressurized liquid supplied by the high-pressure accumulator.

Recharging the high-pressure accumulator is also transparent and imperceptible to the driver because such recharging occurs whenever the brake pedal is not activated. This recharge is controlled by the servo-brake that maintains the position of the brake pedal.

According to an advantageous characteristic, the system has a connection between the primary chamber and the brake fluid reservoir equipped with a solenoid valve controlled by the module.

According to an advantageous characteristic, in the dynamic braking step, the control circuit activates the solenoid valve connecting the primary chamber to the reservoir to open it and leave in its closed position the solenoid valve connecting the high-pressure accumulator to the outlet conduit of the primary chamber.

According to an advantageous characteristic, in the second step of the dynamic braking phase, the circuit closes the solenoid valve and opens the solenoid valve connecting the high-pressure accumulator to the outlet conduit on the primary chamber.

This communication between the primary chamber and the reservoir during the first step of the dynamic braking phase is used to simulate the impression of hydraulic braking for the driver even though the mode of braking actually applied is dynamic braking.

In a variant embodiment the system includes a pressure accumulator connected to the primary chamber by a solenoid valve controlled by a trajectory correction module in order to effect communication between this pressure accumulator and the primary chamber during the first step of dynamic braking.

In certain situations, this type of embodiment can simplify the embodiment of the brake system and consolidate the high-pressure accumulator, the pressure accumulator, and the solenoid valves that control them in an assembly that can be easily integrated into the ESP module.

In general, according to an interesting characteristic that has already been partly discussed above, the high-pressure accumulator and its solenoid valve, as well as the solenoid valve on the reservoir or low-pressure accumulator, its solenoid valve and the pressure accumulator and its solenoid valve are integrated into the module.

According to another useful characteristic, the high-pressure accumulator and the low-pressure accumulator are cylinders equipped with a spring-loaded piston.

According to another useful characteristic, the reservoir solenoid valve, the high-pressure accumulator solenoid valve, and the accumulator solenoid valve are spool solenoid valves closed by a spring-activated mechanical return when there is no current.

Another object of the present invention is an electro-hydraulic dynamic brake control method characterized by the following control phases:
 during a phase preparatory to braking, the high-pressure accumulator is filled from the primary chamber by activating the servo-brake in the absence of action on the brake or of mechanical brake control by the ESP module and the supply of brake fluid accumulated in the high-pressure accumulator is blocked during a dynamic braking phase, two steps occur:

dynamic braking properly speaking with energy recovery is brought about by isolating the master cylinder from the wheel brakes and, using the servo-brake, action on the brake pedal results in deceleration to a threshold speed from threshold speed to full stop, the primary chamber alone is connected to the high-pressure accumulator and to the ESP module in order to supply the latter with pressurized brake fluid from the accumulator and the wheel brakes are supplied for mechanical braking.

The present invention is described below in greater detail using the embodiments of a dynamic brake system shown very schematically in the attached drawings.

DETAILED DESCRIPTION

Figure 1:
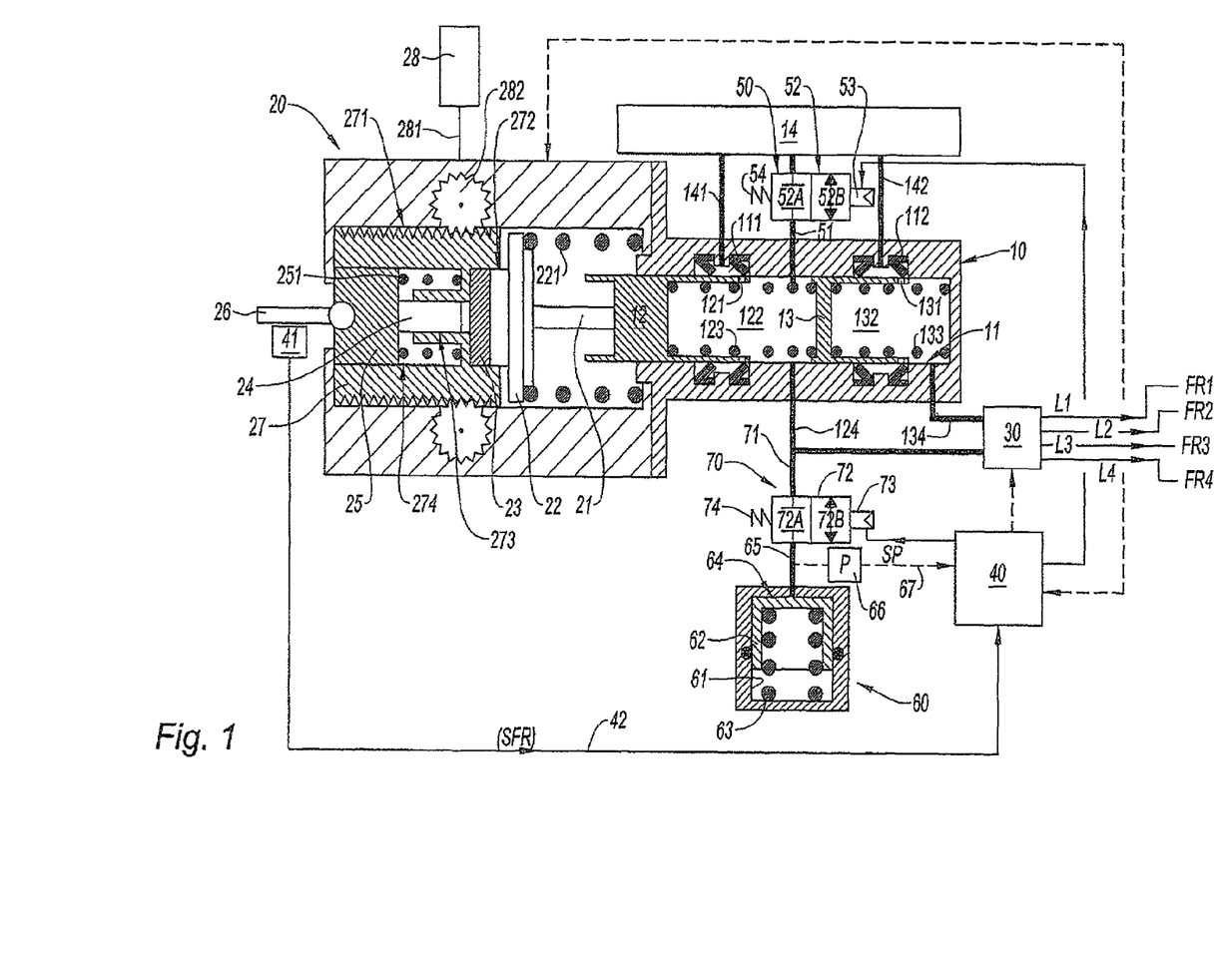
FIG. 1 is a drawing of the brake system according to the present invention.

As shown in FIG. 1, the present invention involves a brake system composed of tandem master cylinder 10 connected to electric-motor 28 servo-brake 20 in order to activate wheel brakes FR1-4 by means of ESP brake control module 30 connected to control circuit 40, which receives various information about vehicle operating parameters as well as brake trigger signal SFR to trigger a dynamic braking operation; the electrical portion of the vehicle's kinetic energy recovery at the generator is not shown in the drawings.

Master cylinder 10 has bore hole 11 that accepts primary piston 12 and secondary piston 13; secondary piston 13 is pushed against the bottom of bore hole 11 by spring 133; primary piston 12 is separated from secondary piston 13 by spring 123. Pistons 12, 13 are hollow pistons formed from a cylinder and a bottom to delimit a chamber 122, 132 in each and to accept springs 123, 133. Primary piston 12 and secondary piston 13 have supply ports 121, 131 each of which communicates with a peripheral supply groove 111, 112 in the housing of master-cylinder 10; said grooves 111, 112 are connected to brake fluid reservoir 14. Each groove 111, 112 includes lip seals, not shown, and arranged according to the pressure difference to which they are exposed, in accordance with the understanding of the skilled practitioner. In the appropriate position, with master cylinder 10 at rest, supply ports 121, 131 of the two pistons 12, 13 communicate with supply grooves 111, 112 and with brake-fluid reservoir 14 so that primary chamber 122 and secondary chamber 132 fill with pressurized brake fluid from reservoir 14 (atmospheric pressure). The connection between reservoir 14 and bore hole 11 is represented by two conduits 141, 142, each of which is associated with one of chambers 122, 132 by means of grooves 111, 112.

When braking, primary piston 12 is pushed and moves, which closes port 121 in bore hole 11, thereby blocking communication of its chamber 122 with reservoir 14 (141). Primary chamber 122, filled with liquid, then functions as a piston, pushing secondary piston 13, which in turn compresses the brake fluid in its chamber 132. The brake fluid, whose pressure is identical in both chambers 122, 132, feeds ESP module 30 through two independent outlet conduits 124, 134. The ESP module activates the wheel brakes according to a braking program it must apply, based on the parameters and detection signals it will have received, depending on the operating conditions known by the ESP module. This connection may be subject to external control by control circuit 40.

Connections L1-L4 with wheel brakes FR1-4, controlled by ESP module 30, provide the controlled feed of wheel brakes FR1-4.

Primary piston 12 is assisted by the action of electric servo-brake 20 by means of push rod 21, which is itself actuated by helper piston 22 by means of reaction ring 23 and, if applicable, by intermediary piston 24. Intermediary piston 24 is itself subject to the action of plunger 25 connected to brake pedal control rod 26. Reaction ring 23 is carried by actuator piston 27, controlled by electric motor 28 of servo brake 20, which transmits its motion by means of drive 281 connected to one or more gears 282, engaging with respective rack 271 of actuator piston 27.

Actuator piston 27 has receiving cylinder 272 for reaction ring 23 and a guide for helper piston 22 on the side turned toward tandem master cylinder 10.

On the other side, actuator piston 27 has guide cylinder 273 for intermediary piston 24 and guide cylinder 274 for plunger 25.

Helper piston 22 is equipped with return spring 221 and plunger 25 of return spring 251; this latter is pressed against the bottom of actuator piston 27 while return spring 221 of the helper piston is pressed against the bottom of the servo brake 20 housing.

Action on the brake pedal moves control rod 26, which is detected by sensor 41, connected by signal transmission line 42 to control circuit 40, which activates motor 28 of the electric servo-brake. This drives actuator piston 27, which pushes helper piston 22, push rod 21, and primary piston 12 to pressurize the brake fluid in chambers 122, 132.

The brake system also has solenoid valve 50 controlled by control circuit 40 and positioned between hydraulic fluid reservoir 14 and primary chamber 122 of master cylinder 10 through conduit 51 that directly connects chamber 122 and reservoir 14 on the other side of supply groove 111 of primary chamber 122. The outlet of conduit 51 is situated in a position not covered by primary piston 12 in bore hole 11 of master cylinder 10 when the master cylinder is at rest. Solenoid valve 50 is a spool solenoid valve 52 with two positions, 52A, 52B; position 52A is the closed position and the other position, 52B, is the open position. The spool is directed by actuator 53 toward its active position; it is returned by spring 54. Active position 52B, whose duration is shortest, is the one that activates actuator 53 (electromagnet) connected to control circuit 40.

The conduit of primary chamber 122 and the conduit of secondary chamber 132 are separately connected to ESP module 30 by a distinct conduit 124, 134.

Outlet conduit 124 of primary chamber 122 is also connected to a high-pressure accumulator 60 by means of solenoid valve 70 controlled by control circuit 40. High-pressure accumulator 60 is a cylinder 61 forming, with piston 62 pushed by spring 63, a high-pressure chamber 64 connected to the outlet of solenoid valve 70 by conduit 65. Chamber 64 of high-pressure accumulator 60 is connected to pressure sensor 66 connected to conduit 65, thereby supplying pressure signal SP over line 67 to control circuit 40.

Solenoid valve 70 is a spool solenoid valve 72 with two positions, 72A, 72B; position 72A is the closed position and the other position, 72B, is the open position. In the closed position, solenoid valve 70 cuts the connection between conduit 124 and high-pressure accumulator 60, while in the open position, 72B, the solenoid valve enables high-pressure accumulator 60 to communicate with conduit 124. Spool 72 is controlled by actuator 73, consisting of an electromagnet connected to control circuit 40 when placed in the open position. The return to neutral position or closed position, 72A, is effected by return spring 74. Solenoid valve 70 is connected to conduit 124 by conduit 71.

In this arrangement, only primary chamber 122 is connected to high-pressure accumulator 60, which is thereby connected to ESP module 30 independently of conduit 134 of secondary chamber 132.

Figure 2:
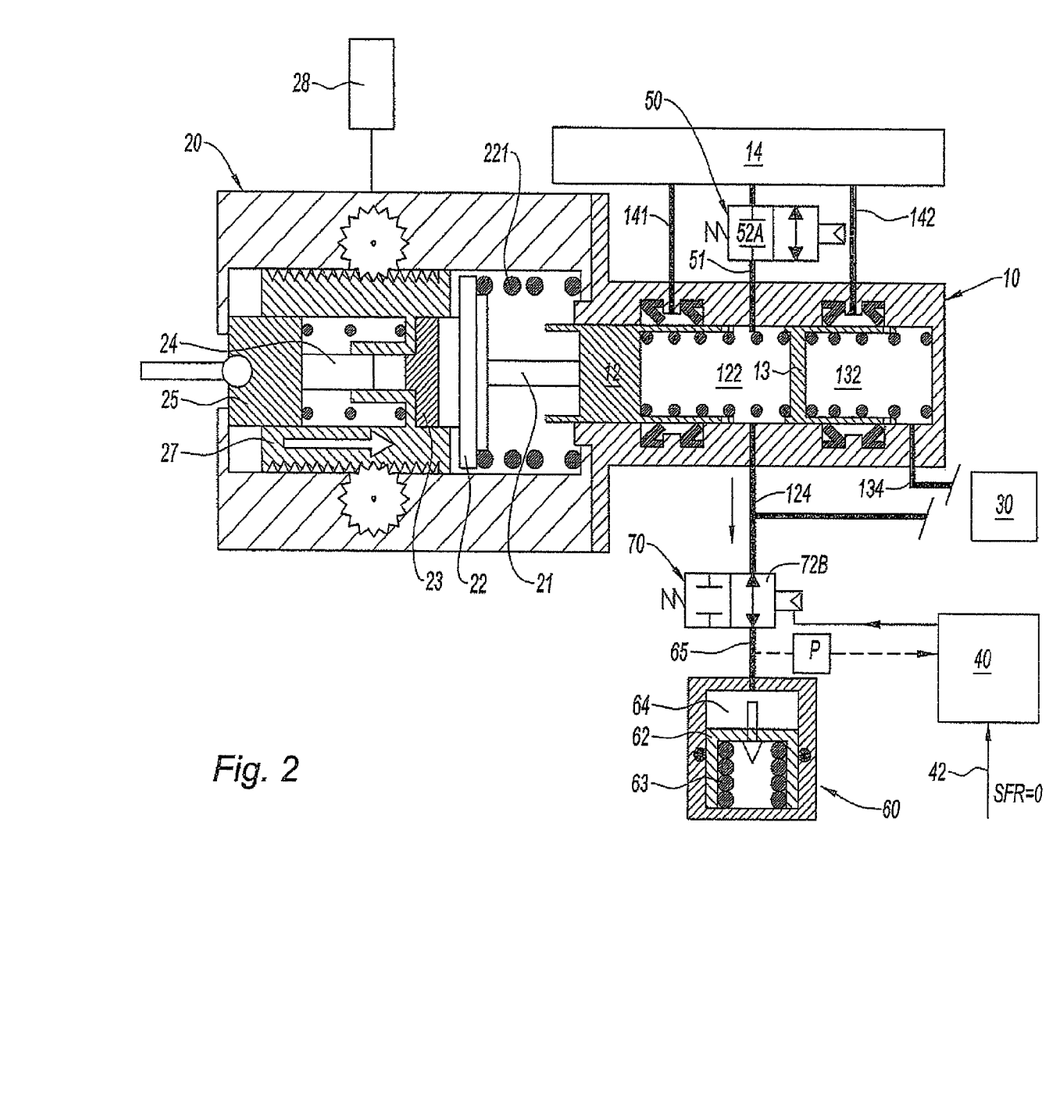
FIG. 2 shows the brake system according to the present invention during the phase when the high-pressure accumulator is being filled.
Figure 6:
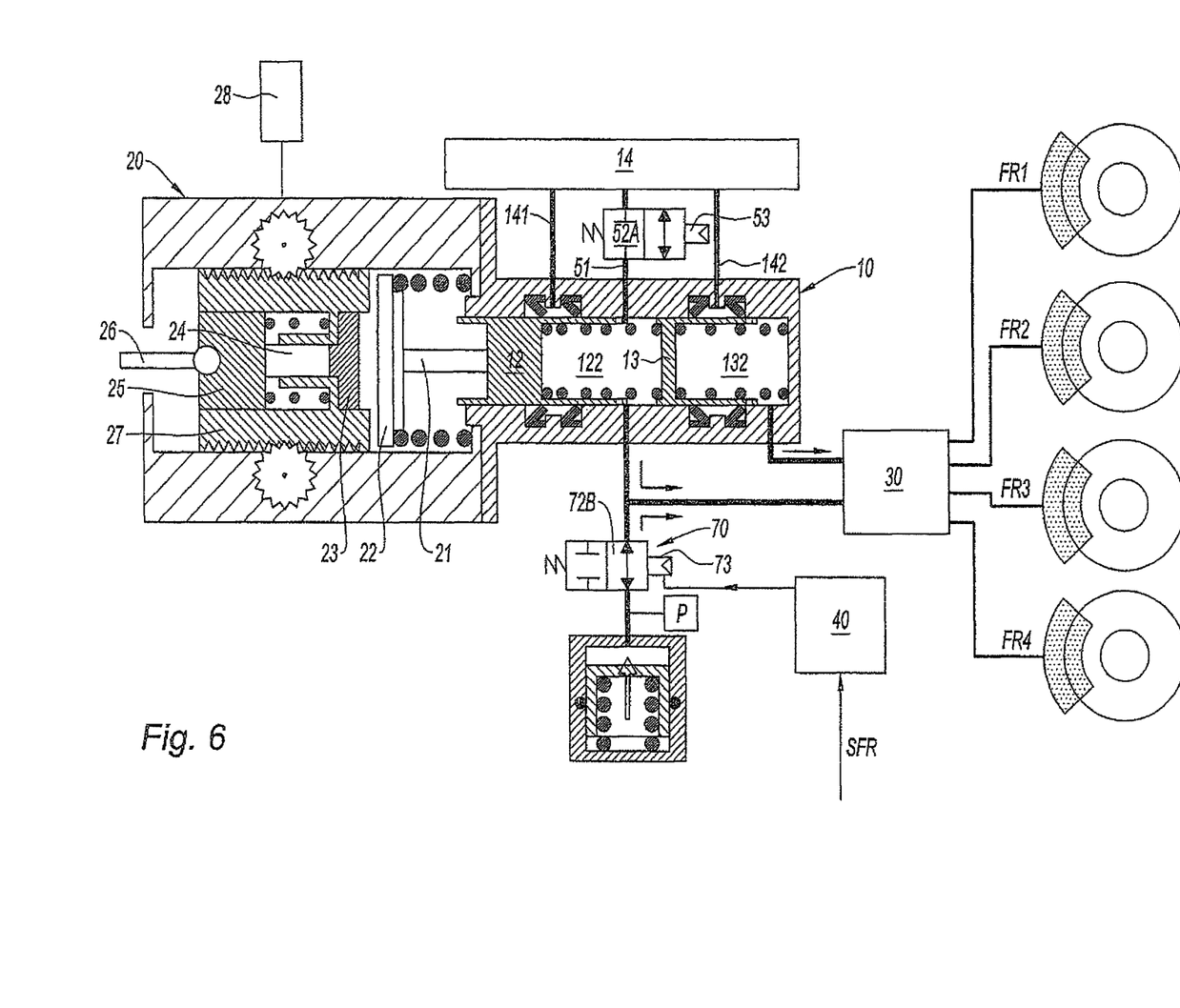
FIG. 6 is a view similar to that of FIG. 5, corresponding to the conclusion of the dynamic braking phase.
Figure 7:
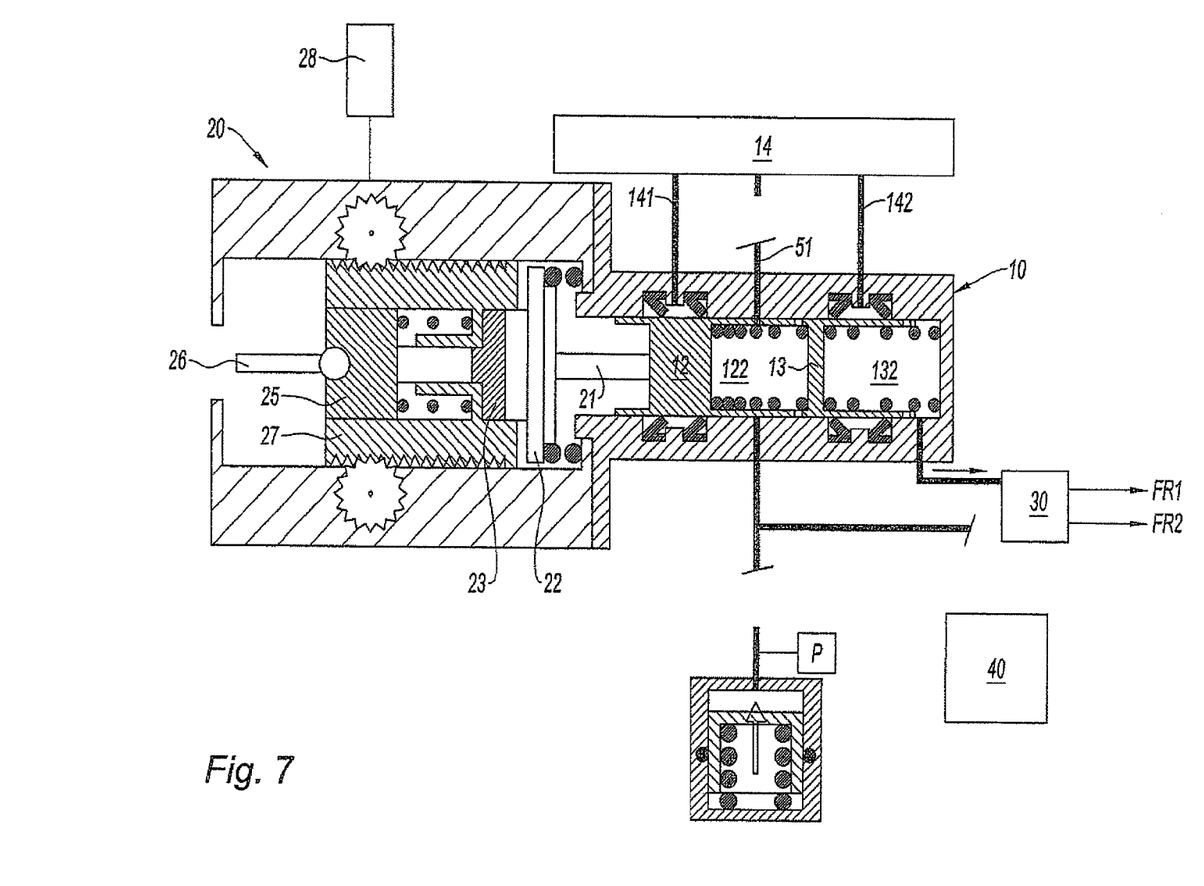
FIG. 7 is a diagram of the installation in emergency operation mode.

The different steps of braking are shown in FIG. 2 and the following figures, namely a preparatory phase of filling the high-pressure accumulator (FIGS. 2 and 3), a mechanical braking phase without energy recovery (FIG. 4), and a dynamic braking phase, that is, with energy recovery (FIGS. 5 and 6), and an emergency braking situation in the event of a leak in the primary circuit (FIG. 7).

Figure 3:
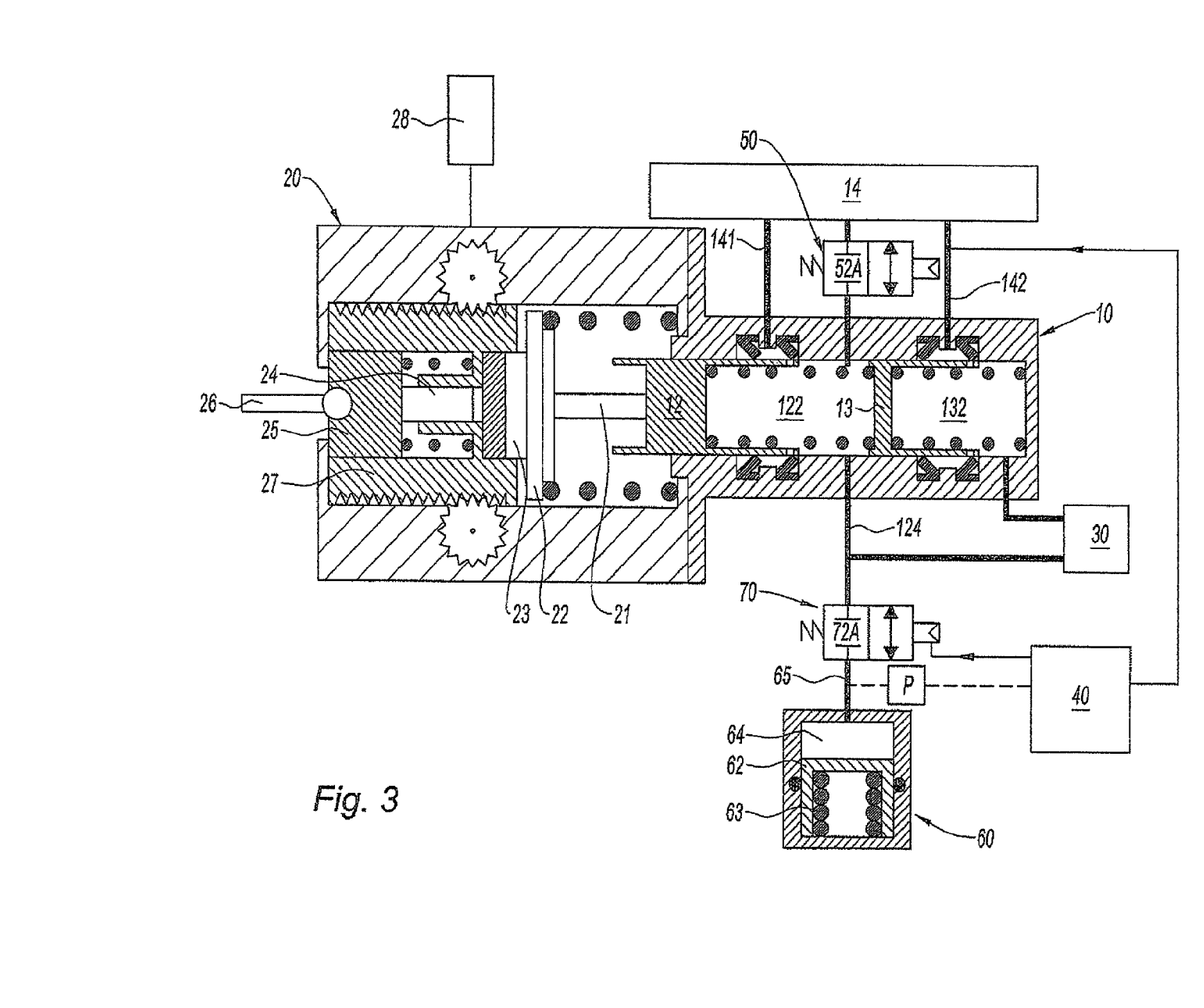
FIG. 3 shows the brake system when ready to operate.

Preparatory Phase: FIGS. 2 and 3

During the preparatory phase (FIG. 2), in the absence of braking action (SFR=0), control circuit 40 detects the absence of a braking request from the brake pedal or from the ESP module. Wheel brakes FR1-4 are isolated by ESP module 30 and are not supplied with pressurized hydraulic fluid. Control circuit 40 actuates electric servo-brake 20 to compress the brake fluid in master cylinder 10. Solenoid valve 70, between principal chamber 122 and high-pressure accumulator 60, is open; solenoid valve 50, between chamber 122 and reservoir 14, is closed. Brake fluid is delivered to high-pressure accumulator 60, which is pressurized.

At the end of this filling and pressurizing phase (FIG. 3), solenoid valve 70 of high-pressure accumulator 60 is closed (position 72A); because solenoid valve 50 between chamber 122 and reservoir 14 is open, primary piston 12 is withdrawn into its rest position and primary chamber 122 fills with hydraulic fluid. Master cylinder 10 is ready to operate under normal conditions and solenoid valve 50 of reservoir 14 (position 52A) is closed.

Figure 4:
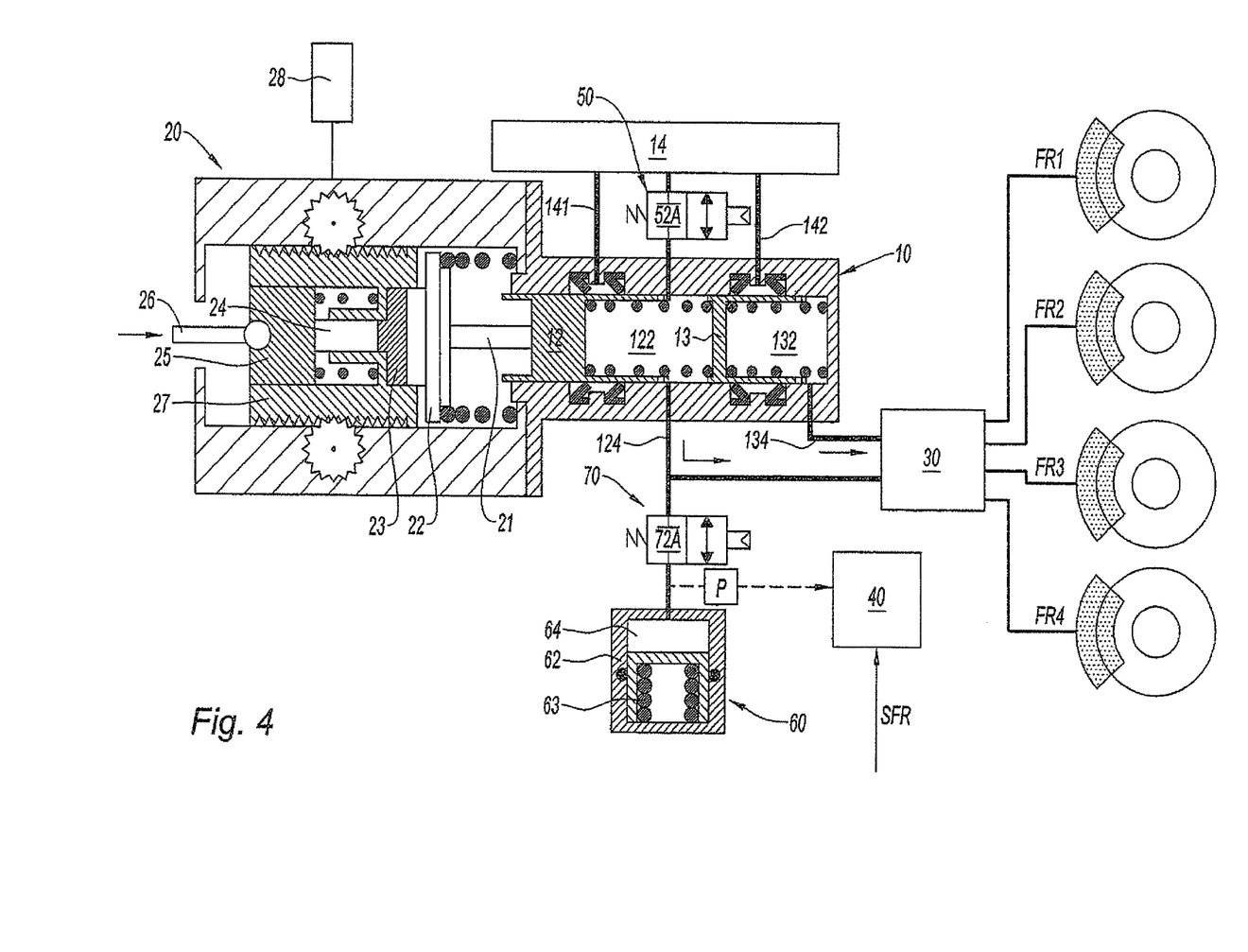
FIG. 4 is a schematic view of the brake system when mechanical braking is being used.

Mechanical Braking: FIG. 4

Taking as our starting point the situation shown in FIG. 4, a braking request (SFR) can be processed mechanically under the normal conditions of operation of electromechanical servo-brake 20, which, when solicited by action on the brake pedal, pushes primary piston 12 and secondary piston 13 so that pressurized fluid is sent to ESP module 30, which distributes the fluid among wheel brakes FR1-4 in response to the braking request.

This mechanical braking assumes that control circuit 40 has selected this method of operation in preference to dynamic braking for reasons that depend on a program and selection criteria that will not be developed here.

In this mode of braking, solenoid valve 50, connecting reservoir 14 to chamber 122 is closed (position 52A) and supply to chambers 122, 132 or the supplementary supply depends on the position of supply ports 121, 132 of principal piston 12 and secondary piston 13. In this mode of operation, solenoid valve 70 is also in closed position 72A, cutting the connection between high-pressure accumulator 60 and conduit 124. Chambers 122, 132 are each connected separately through their respective conduit 124, 134 to ESP module 30.

Figure 5:
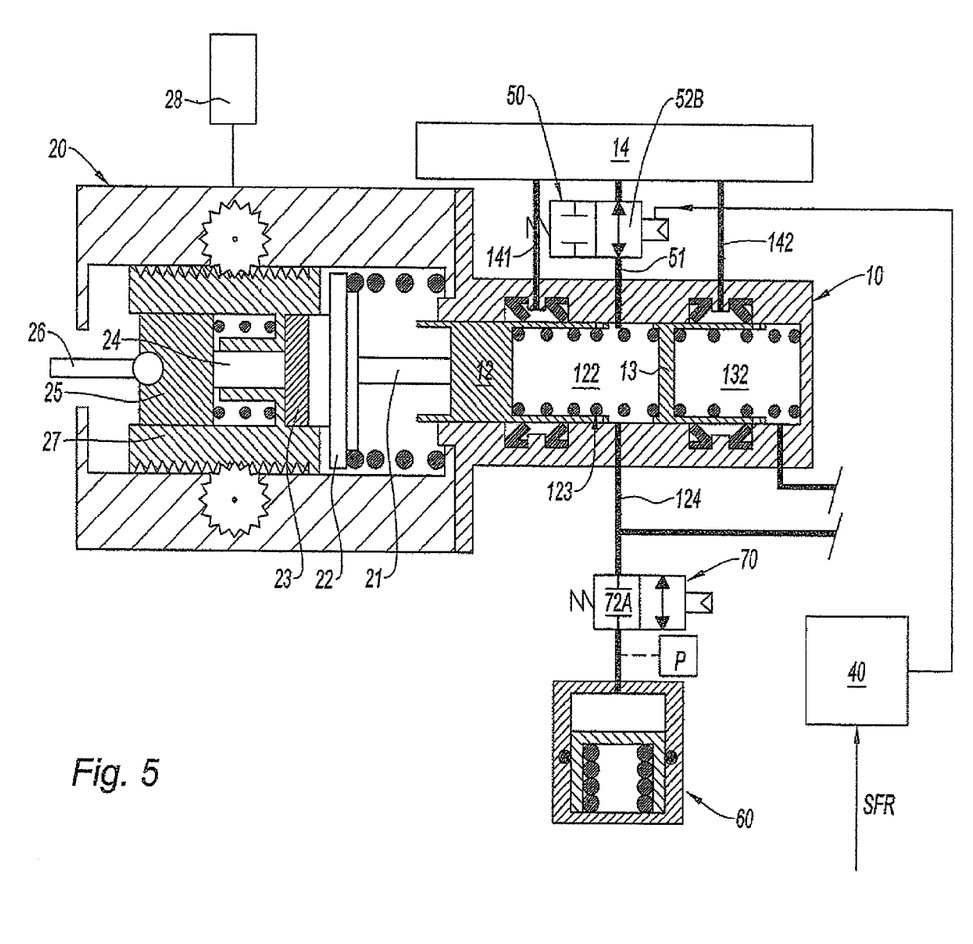
FIG. 5 is a schematic view of the brake system in dynamic braking mode with energy recovery.

Dynamic Braking: FIGS. 5 and 6

Dynamic braking is selected by control circuit 40 based on selection criteria not described here, in preference to mechanical braking with servo-brake 20.

Dynamic braking is broken down into two phases, the first at the VS threshold shown in FIG. 5, with recovery of the vehicle's kinetic energy, and another below speed threshold VS, corresponding to the conclusion of braking until full stop, this last phase being shown in FIG. 6.

If control circuit 40 decides to provide dynamic braking with energy recovery to respond to a request for braking action (SFR), ESP module 30 cuts the supply to wheel brakes FR1-4. High-pressure accumulator 60 is isolated from conduit 124 by closed solenoid valve 70 (position 72A) and communication is established between chamber 122 of master cylinder 10 and reservoir 14 by means of solenoid valve 50 in activated position 52B, opening communication between conduit 51 and reservoir 14 so that fluid in chamber 122 can return to reservoir 14 and primary piston 12 is free to advance against the opposing force of spring 123; auxiliary piston 13 remains stationary because the volume of its chamber 132 is closed and does not communicate with reservoir 14. Servo-brake 20 can satisfy the braking request exercised by the brake pedal by advancing actuator piston 27, which displaces primary piston 12, thereby directing fluid in chamber 122 of master cylinder 10 to reservoir 14. Dynamic braking with energy recovery is possible until a slow speed (threshold speed, VS), at which this mode of braking can no longer provide the deceleration requested by the driver.

This phase of braking below the threshold speed and up to or near the moment when the vehicle stops is provided by the transition to mechanical braking shown in FIG. 6.

Solenoid valve 20 preserves its controlled position, as shown in FIG. 5, in such a way that the user perceives no change, but control circuit 40 triggers the closure of solenoid valve 50 by cutting supply to actuator 53 so that spool 52 is immediately returned by spring 54 to its closed position, 52A, cutting the connection between conduit 51 exiting chamber 122 and reservoir 14, then control circuit 40 triggers the opening of solenoid valve 70 of high-pressure accumulator 60, which then communicates with ESP module 30. The hydraulic fluid of high-pressure accumulator 60 is sent to ESP module 30, which distributes it to wheel brakes FR1-4 and ensures mechanical braking.

Emergency Braking: FIG. 7

An emergency situation arises when there is a leak in primary chamber 122. In this case, mechanical braking is provided by servo-brake 20, which pushes primary piston 12 and this latter mechanically pushes secondary piston 13. The hydraulic fluid in secondary chamber 132 is thereby pressurized and supplies ESP module 30, which controls the brake circuit in failure mode, in general two wheel brakes out of the four FR1-4 on the vehicle.

During normal operation, after the second dynamic braking step, control circuit 40 restores the various elements of the braking system to their rest position then controls filling of the high-pressure accumulator so that it is ready for a new dynamic braking event.

Figure 8:
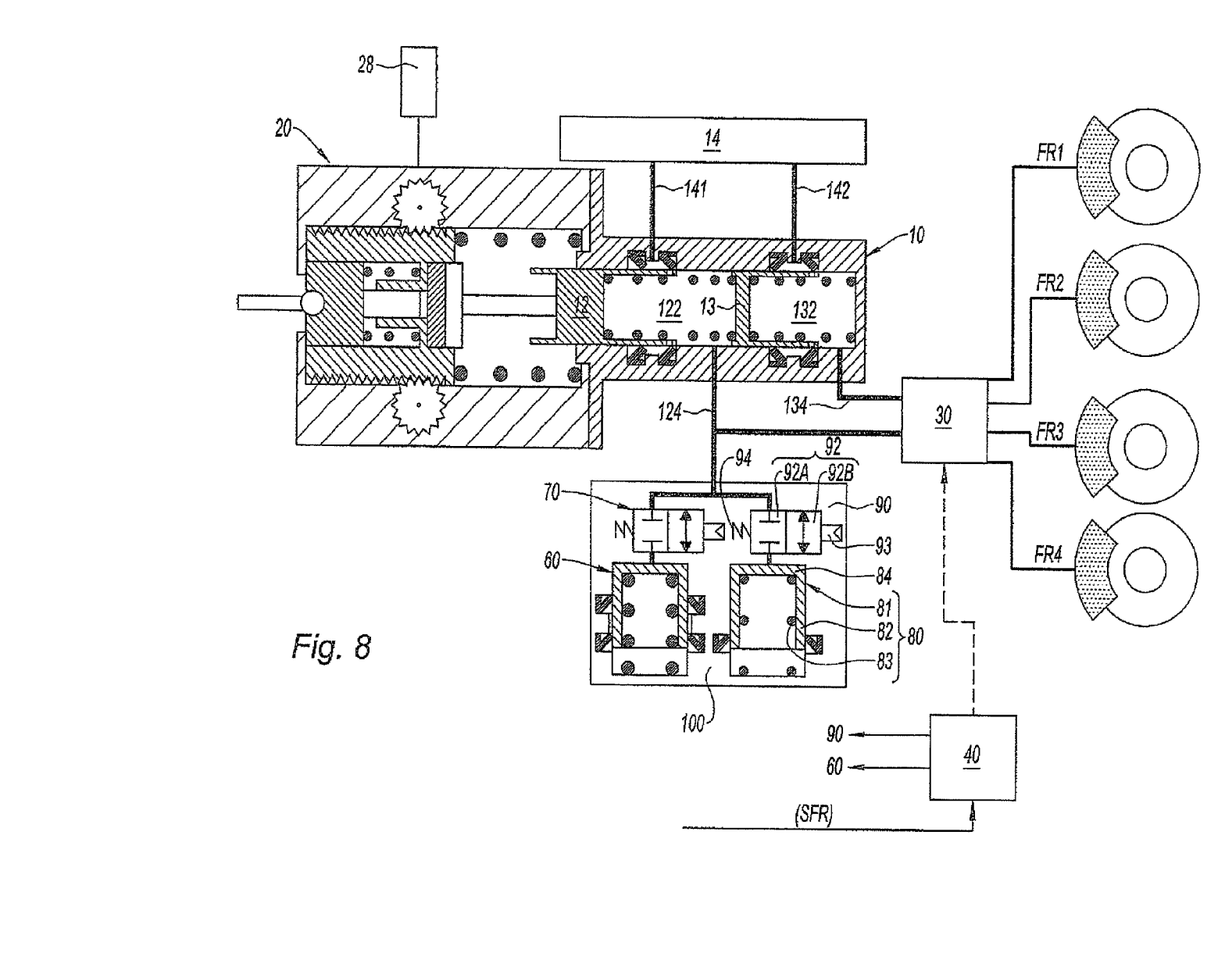
FIG. 8 shows a variant embodiment of the dynamic brake system according to the present invention.

FIG. 8 shows a variant embodiment of the electro-hydraulic dynamic brake system, corresponding essentially to the first embodiment. For those parts that are identical to the first embodiment, we will use the same references and the previous description will not be repeated. The variant differs from the first embodiment in the elimination of solenoid valve 50 connecting primary chamber 122 to reservoir 14 to enable operation of electro-hydraulic servo-brake 20 in dynamic braking mode when master cylinder 10 is isolated from the brakes by module 30.

According to the variant, principal chamber 122 of master cylinder 10 is connected to low-pressure accumulator 80 composed of cylinder 81 accommodating piston 82 subject to the action of thrust spring 83 and delimiting chamber 84. Said chamber 84 is connected by solenoid valve 90 to conduit 124 terminating in primary chamber 122. Solenoid valve 90 consists of spool 92 controlled by electromagnet 93 for the active position; spring 94 is used to return it to rest position. This spool has two positions, one (92A) isolates accumulator 80 from conduit 124 and the other (92B) ensures communication between accumulator 80 and conduit 124 and, thus, with primary chamber 122.

Said solenoid valve 90 is controlled by control circuit 40 to provide a function relatively equivalent to that of solenoid valve 50.

For the first step of dynamic braking mode, when force is exerted on the brake pedal, accumulator 80 receives brake fluid pushed by primary piston 12 in primary chamber 122.

According to another embodiment, not shown, concerning the practical embodiment of the installation, high-pressure accumulator 60 and its solenoid valve 70, and, if applicable, solenoid valve 50, are integrated into module 30. The same applies with the variant embodiment in FIG. 8, whose high-pressure accumulator 60 and pressure accumulator 80, as well as associated solenoid valves 70, 90 are combined in assembly 100 integrated into module 30.

In general, the present invention applies to electro-hydraulic dynamic braking systems for automobile vehicles.

The list of reference numbers is as follows:
- 10 Tandem master cylinder
- 11 Bore hole
    - 111 Peripheral supply groove
    - 112 Peripheral supply groove
- 12 Primary piston
    - 121 Supply port
    - 122 Primary chamber
    - 123 Primary spring
- 13 Secondary piston
    - 131 Supply port
    - 132 Secondary chamber
    - 133 Secondary spring
- 14 Brake fluid reservoir
    - 141 Conduit
    - 142 Conduit
- 20 Servo-brake
- 21 Push rod
- 22 Helper piston
- 23 Reaction ring
- 24 Intermediary piston
- 25 Plunger
- 26 Control rod
- 27 Actuator piston
    - 271 Rack
- 28 Electric motor
    - 281 Transmission
    - 282 Gear
- 30 ESP module
- 40 Control circuit
- 41 Sensor
- 42 Signal transmission line
- 50 Solenoid valve
- 51 Conduit
- 52 Spool
- 52A Closed position
- 52B Active open position
- 53 Actuator
- 54 Return spring
- 60 High-pressure accumulator
- 61 Cylinder
- 62 Piston
- 63 Thrust spring
- 64 High-pressure chamber
- 65 Connecting conduit
- 66 Pressure sensor
- 67 Signal transmission line
- 70 Solenoid valve
- 71 Conduit
- 72 Spool
- 72A Closed position
- 72B Open position
- 73 Actuator
- 74 Return spring
- 80 Pressure accumulator
- 81 Cylinder
- 82 Piston
- 83 Thrust spring
- 84 Chamber
- 90 Solenoid valve
- 92 Spool
    - 92A Closed position
    - 92B Open position
- 93 Actuator
- 94 Return spring

What is claimed is:

1. An electro-hydraulic dynamic brake system, comprising:
    an electric-motor servo-brake to actuate a master cylinder connected to wheel brakes by an ESP module;
    a first accumulator connected to an outlet conduit of a primary chamber of the master cylinder and to an inlet of the ESP module by a first solenoid valve, wherein the first accumulator is a high-pressure accumulator;
    a control circuit to receive brake request signals from the servo-brake and the ESP module to control the first solenoid valve based on a selected mode of braking or an imposed mode of braking;
    wherein the control circuit is configured to control:
        a preparatory braking phase during which the first accumulator is filled from the primary chamber by actuating the servo-brake when there is no action on a brake pedal or mechanical braking command by the ESP module and by blocking the pressurization of brake fluid that has accumulated in the first accumulator; and
        a dynamic braking phase, which is broken down into two operations, including: (i) a dynamic braking operation, with energy recovery, that involves isolating the master cylinder from the wheel brakes and allowing the servo-brake to respond to action on the brake pedal until deceleration to a threshold speed, and (ii) another operation from threshold speed until full stop, during which the primary chamber is connected solely to the first accumulator and to the ESP module to supply the ESP module with pressurized brake fluid from the first accumulator and to activate the wheel brakes for mechanical braking.

2. The brake system of claim 1, wherein there is a connection between the primary chamber and a brake fluid reservoir supplied with a second solenoid valve controlled by the ESP module.

3. The brake system of claim 2, wherein, in the dynamic braking operation in the dynamic braking phase, the control circuit actuates the second solenoid valve so as to open the second solenoid valve and leave the first solenoid valve in its closed position.

4. The brake system of claim 2, wherein, in the second operation of the dynamic braking phase, the control circuit controls closure of the second solenoid valve and opens the first solenoid valve.

5. The brake system of claim 4, wherein the first accumulator is a cylinder equipped with a piston loaded by a spring, and wherein the first accumulator and the first and second solenoid valves are integrated into the ESP module.

6. The brake system of claim 2, wherein the first and second solenoid valves are spool solenoid valves with a mechanical spring-loaded return in a closed position, in the absence of any current.

7. The brake system of claim 6, wherein the first accumulator is a cylinder equipped with a piston loaded by a spring.

8. The brake system of claim 2, wherein the first accumulator and the first and second its solenoid valves are integrated into the ESP module.

9. The brake system of claim 8, wherein the first accumulator is a cylinder equipped with a piston loaded by a spring.

10. The brake system of claim 1, wherein a second accumulator, which is a pressure accumulator, is connected to the primary chamber by a second solenoid valve controlled by the ESP module so as to establish communication between the second accumulator and the primary chamber during the first operation of dynamic braking.

11. The brake system of claim 10, wherein the first and second accumulators are cylinders equipped with a piston loaded by a spring.

12. The brake system of claim 10, wherein the first and second solenoid valves are spool solenoid valves with a mechanical spring-loaded return in a closed position, in the absence of any current.

13. The brake system of claim 12, wherein the first and second accumulators are cylinders equipped with a piston loaded by a spring.

14. The brake system of claim 10, wherein the first and second accumulators and the first and second solenoid valves are integrated into the ESP module.

15. The brake system of claim 14, wherein the first and second accumulators are cylinders equipped with a piston loaded by a spring.

16. The brake system of claim 1, wherein the first accumulator is a cylinder equipped with a piston loaded by a spring.

17. A braking method for an electro-hydraulic dynamic brake system, the system including (a) an electric-motor servo-brake configured to actuate a master cylinder connected to wheel brakes by an ESP module, (b) a control circuit configured to receive braking request signals from the servo-brake and the ESP module to control a first solenoid valve of a first accumulator according to a selected braking mode or an imposed braking mode, wherein the first accumulator is a high-pressure accumulator, the method comprising:

filling, in a phase preparatory to braking, the first accumulator from a primary chamber of the master cylinder by actuating the servo-brake in absence of action on a brake pedal or mechanical braking control by the ESP module and the pressurization of brake fluid accumulated in the first accumulator is inhibited; and performing, in a dynamic braking phase, two operations as follows:

dynamically braking, with energy recovery, by isolating the master cylinder from the wheel brakes, and allowing the servo-brake to respond to action on the brake pedal until deceleration to a threshold speed, and providing that, from threshold speed until full stop, the primary chamber alone is connected to the first accumulator and to the ESP module so as to supply the ESP module with pressurized brake fluid from the first accumulator and activate the wheel brakes for mechanical braking.

* * * * *